(12) United States Patent
Babbini et al.

(10) Patent No.: US 11,009,017 B2
(45) Date of Patent: May 18, 2021

(54) RECIPROCATING COMPRESSOR VALVE BODY MADE BY ADDITIVE MANUFACTURING

(71) Applicant: Nuovo Pignone Tecnologie - S.r.l., Florence (IT)

(72) Inventors: Alberto Babbini, Florence (IT); Douglas Michael McClure, West Chester, OH (US); Stephen Joseph Waymeyer, West Chester, OH (US); Federico Puccinelli, Florence (IT)

(73) Assignee: Nuovo Pignone Tecnologie SRL, Florence (IT)

( * ) Notice: Subject to any disclaimer, the term of this patent is extended or adjusted under 35 U.S.C. 154(b) by 0 days.

(21) Appl. No.: 16/448,486

(22) Filed: Jun. 21, 2019

(65) Prior Publication Data

US 2019/0390664 A1  Dec. 26, 2019

(30) Foreign Application Priority Data

Jun. 21, 2018  (IT) .................... 102018000006557

(51) Int. Cl.
| | |
|---|---|
| *F16K 31/122* | (2006.01) |
| *F04B 7/02* | (2006.01) |
| *F04B 39/08* | (2006.01) |
| *F04B 39/10* | (2006.01) |
| *B33Y 80/00* | (2015.01) |
| *F16K 15/18* | (2006.01) |
| *F04B 53/10* | (2006.01) |

(Continued)

(52) U.S. Cl.
CPC ............. *F04B 7/02* (2013.01); *F04B 39/08* (2013.01); *F04B 39/1053* (2013.01); *B33Y 80/00* (2014.12); *F04B 49/22* (2013.01); *F04B 53/10* (2013.01); *F16K 15/08* (2013.01); *F16K 15/18* (2013.01)

(58) Field of Classification Search
CPC ........ F04B 7/02; F04B 39/08; F04B 39/1053; F04B 49/22; F04B 53/10; B33Y 80/00; B33Y 10/00; F16K 15/08; F16K 15/18
USPC .... 137/485, 382, 838, 89, 110, 148, 246.11, 137/246.12, 246.21, 382.5, 454.2, 512.1, 137/516.11, 565.18, 599.01, 601.13, 137/625.28; 417/559
See application file for complete search history.

(56) References Cited

U.S. PATENT DOCUMENTS

| | | | |
|---|---|---|---|
| 1,462,301 A | 7/1923 | Parsons | |
| 1,935,376 A * | 11/1933 | Prellwitz | ................ F16K 15/08 |
| | | | 137/454.4 |

(Continued)

FOREIGN PATENT DOCUMENTS

| | | |
|---|---|---|
| DE | 1114272 B | 9/1961 |
| DE | 1251121 B | 12/1964 |

(Continued)

*Primary Examiner* — Minh Q Le
(74) *Attorney, Agent, or Firm* — Baker Hughes Patent Organization

(57) ABSTRACT

It is disclosed a valve (1) for a reciprocating compressor, comprising a valve body (2) which comprises a seat (3) and a guard (4), the seat (3) and the guard (4) developing substantially parallel to a valve plane (A). The valve (1) also comprises a hydraulic apparatus (7) with pistons (9) and a hydraulic circuit (8) provided with a first portion (8a) which is made by additive manufacturing technology according to digital 3D design data.

13 Claims, 5 Drawing Sheets

(51) Int. Cl.
*F04B 49/22* (2006.01)
*F16K 15/08* (2006.01)

(56) References Cited

U.S. PATENT DOCUMENTS

| | | | | | |
|---|---|---|---|---|---|
| 2,124,323 | A | * | 7/1938 | Voss | F16K 15/08 |
| | | | | | 137/454.4 |
| 3,156,405 | A | * | 11/1964 | Curwen | F04B 27/005 |
| | | | | | 417/326 |
| 3,536,094 | A | * | 10/1970 | Manley, Jr. | F04B 39/1033 |
| | | | | | 137/512.1 |
| 4,483,363 | A | * | 11/1984 | Madoche | F04B 39/1033 |
| | | | | | 137/329.04 |
| 5,052,434 | A | * | 10/1991 | Bauer | F16K 15/08 |
| | | | | | 137/516.13 |
| 5,511,583 | A | * | 4/1996 | Bassett | F04B 39/1033 |
| | | | | | 137/512.1 |
| 5,678,603 | A | * | 10/1997 | Tschop | F16K 15/08 |
| | | | | | 137/512.1 |
| 5,769,117 | A | * | 6/1998 | Wehber | F04B 39/1033 |
| | | | | | 137/516.11 |
| 5,833,209 | A | | 11/1998 | Steinruck | |
| 6,539,974 | B2 | * | 4/2003 | Steinruck | F04B 39/1033 |
| | | | | | 137/512.1 |
| 8,500,420 | B2 | * | 8/2013 | Spiegl | F04B 49/243 |
| | | | | | 417/446 |
| 10,215,295 | B2 | * | 2/2019 | Babbini | F04B 39/08 |
| 2004/0091365 | A1 | | 5/2004 | Spiegl | |
| 2008/0149196 | A1 | * | 6/2008 | Spiegl | F04B 39/1066 |
| | | | | | 137/543.15 |
| 2015/0044081 | A1 | * | 2/2015 | Babbini | F04B 39/102 |
| | | | | | 417/559 |
| 2018/0163881 | A1 | | 6/2018 | Babbini | |
| 2018/0163898 | A1 | * | 6/2018 | Von Arb | B33Y 80/00 |
| 2019/0301647 | A1 | * | 10/2019 | Weber | F16L 19/043 |
| 2020/0096020 | A1 | * | 3/2020 | Funsch | F15B 13/0871 |

FOREIGN PATENT DOCUMENTS

| | | |
|---|---|---|
| DE | 1940376 U | 6/1966 |
| GB | 1034408 A | 6/1966 |
| WO | 2016096331 A1 | 6/2016 |
| WO | 2016188800 A1 | 12/2016 |

* cited by examiner

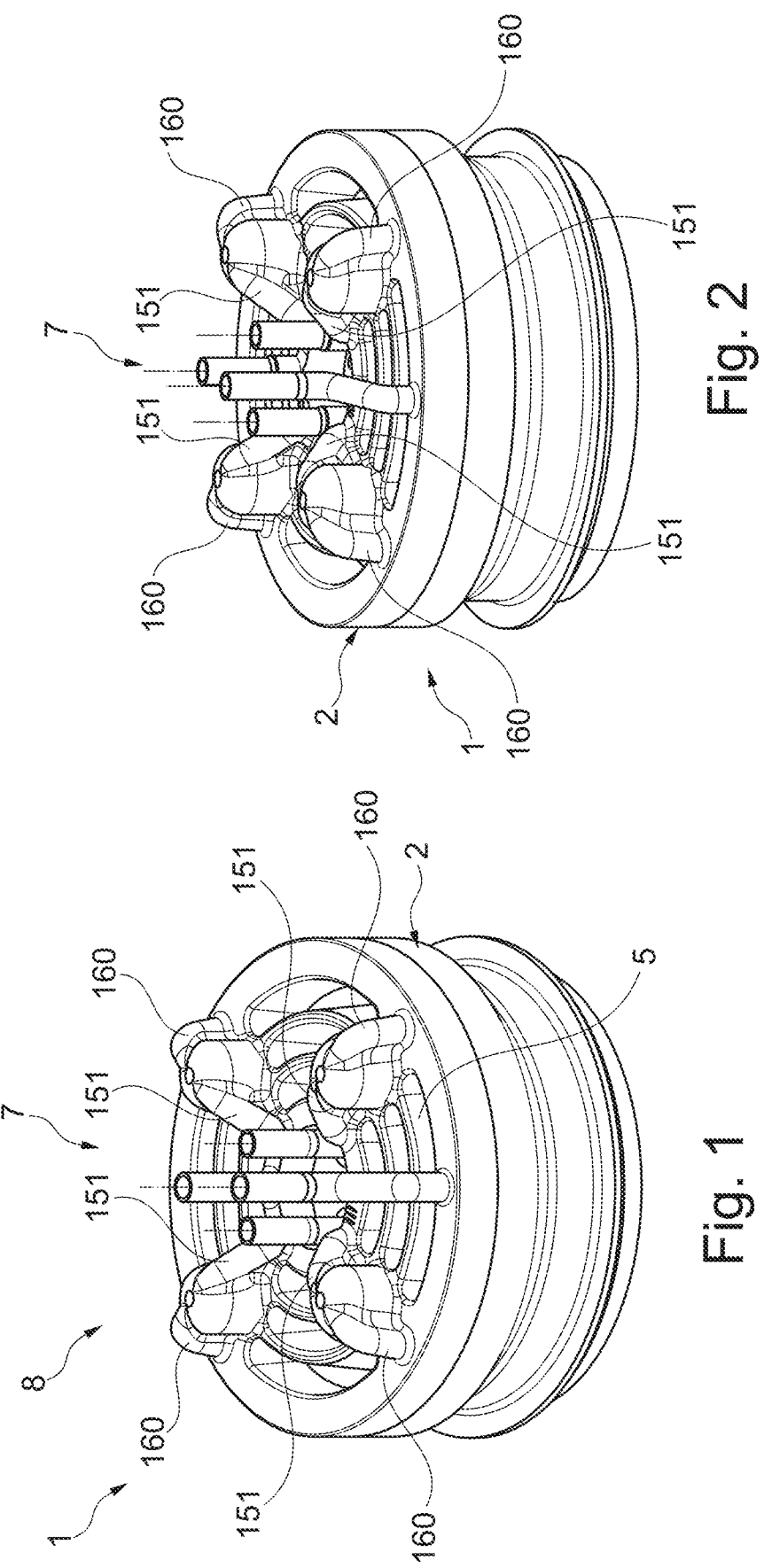

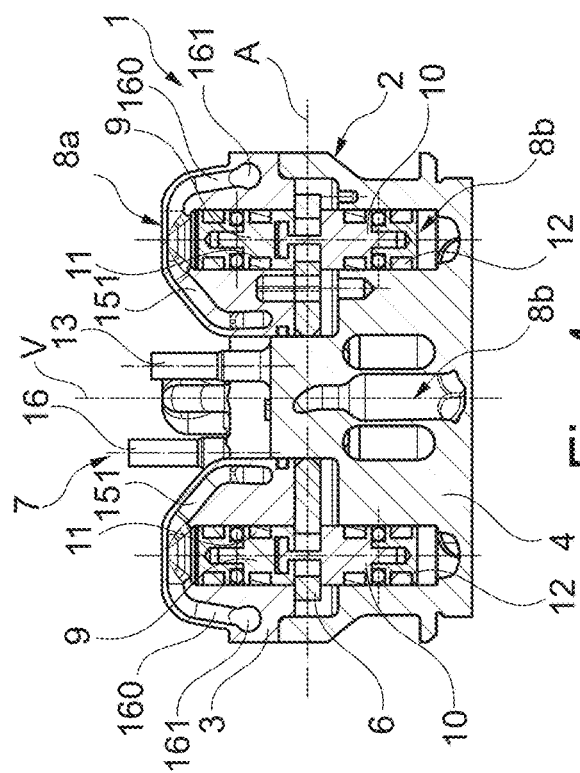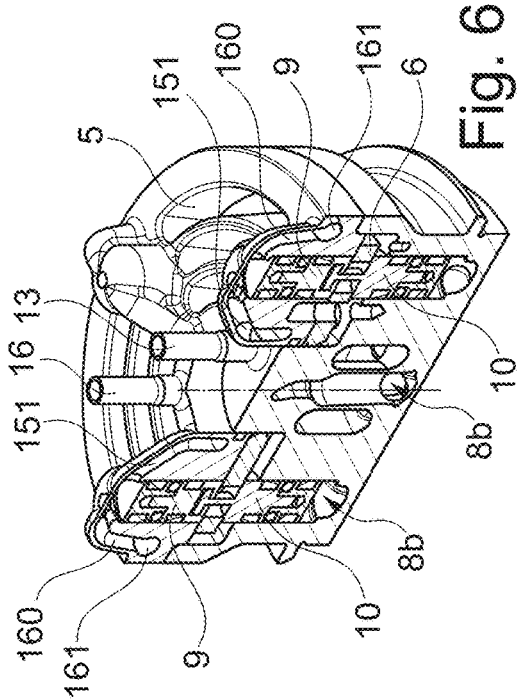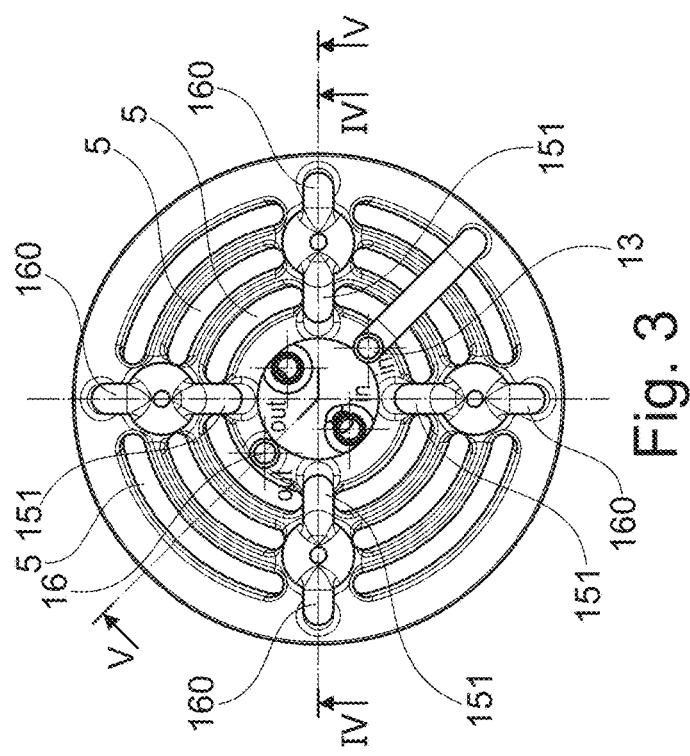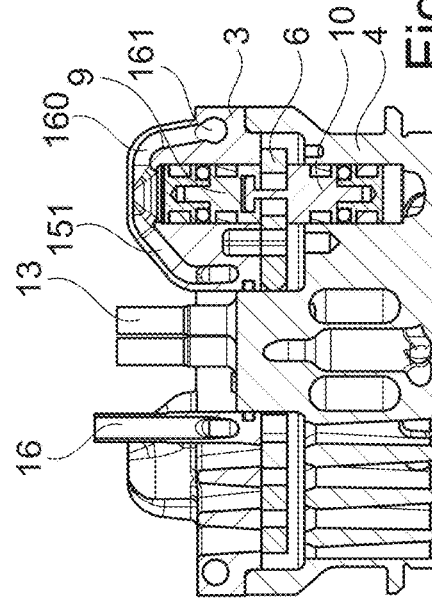

RECIPROCATING COMPRESSOR VALVE BODY MADE BY ADDITIVE MANUFACTURING

CROSS-REFERENCE TO RELATED APPLICATIONS

This application claims the benefit of Italian Patent Application No. 102018000006557 filed on Jun. 21, 2018, the disclosure of which is herein incorporated by reference in its entirety.

DESCRIPTION

Technical Field

The present disclosure concerns reciprocating compressor valves, specifically the production of bodies of the reciprocating compressor valves. Reciprocating compressors can be employed in process applications including refineries, petro chemicals, fertilizers, refrigeration and air, as well as in the gas and oil industry, for gas re-injection, gas lift, pipeline gas transmission, gas storage and fuel gas bursting.

Background Art

It is known that a valve for a reciprocating compressor comprises a seat and a guard facing each other and placed substantially parallel to each other. The seat and the guard both have cavities. A shutter element is placed between the seat and the guard. In particular, the shutter element is designed so that it can cover the cavities on the valve seat.

The shutter element is pushed against the seat by a set of springs acting between the guard and the shutter element itself. The passage of fluid is thus prevented. More than one shutter element can be provided. When the pressure from the working fluid increases beyond a predetermined threshold, it can then overcome the elastic force of the springs, thus forcing the valve open and allowing the passage of the fluid until the pressure decreases below the acting threshold.

WO 2016/188800 discloses a reciprocating compressor comprising a hydraulic apparatus for moving the shutter element between at least an open position and a closed position. Specifically said hydraulic apparatus comprises a hydraulic circuit of which at least a portion is integrated both in the seat and in the guard. The hydraulic circuit comprises a single main duct, integrated into the seat, leading the fluid in pressure from a hydraulic actuator to a plurality of pistons placed in series according to a single line parallel to said single main duct. Said single main duct is a radial duct. Disadvantageously the pressure acting on the pistons is different depending on the position of said pistons, the last one of the series being provided by a lower pressure.

Moreover it is known that additive manufacturing technology refers to a process by which digital 3D design data is used to build up a component in layers by depositing material. The term "3D printing" is increasingly used a synonym for additive manufacturing. However, the letter is more accurate in that is clearly distinguished from conventional methods of material removal. Instead of milling a work piece from solid block, for example, additive manufacturing builds up components layer by layer using material which are available in fine powder form. A range of different metals, plastics and composite materials may be used.

It is desirable to realize a valve for a reciprocating compressor which allows a homogeneous movement of the pistons and consequently of the shutter elements. Accordingly, a new valve would increase the operational life of compressors as well as all members involved in the process.

Further it is object of the present disclosure to provide a valve with variable sections and different lengths of hydraulic ducts. It would reduce the production costs and the complexity of the projects which needs a lot of time work by skilled persons.

SUMMARY

According to one aspect, the present subject matter is directed to a valve for a reciprocating compressor. The valve comprises a hydraulic apparatus for moving a shutter element at least between the open and the closed positions, comprising pistons and a hydraulic circuit. At least a first portion of said hydraulic circuit is integrated in a seat or in a guard of the valve body. The shape of the first portion of the hydraulic circuit is made by additive manufacturing technology according to digital 3D design data.

The pressure over each piston is arranged to have the same value. It is achieved by different embodiments of the shape of the first portion of the hydraulic circuit, specifically of the inlet, of distributing ducts, of radial ducts radially arranged with respect to shape of the distributing duct, and of the outlet.

Additive manufacturing technology allows to easily make every kind of shape of the hydraulic circuit. Advantageously the hydraulic circuit is born with the valve body, i.e. with either the seat and the guard. Additive manufacturing allows precise dimensioning of the ducts according to 3D data generated by a software of a personal computer. Different shapes of the hydraulic circuit could be provided according to the shape of the reciprocating compressor and of the performance to be achieved.

BRIEF DESCRIPTION OF THE DRAWINGS

These and other features of the present invention will become more apparent from the following detailed description of a specific embodiment thereof, shown by way of non-limitative example in the accompanying drawings, in which:

FIG. 1 shows a first perspective view of a reciprocating compressor valve according to a first embodiment;

FIG. 2 shows a second perspective view of the reciprocating compressor valve of FIG. 1;

FIG. 3 shows a top plan view of the reciprocating compressor valve of FIG. 1;

FIG. 4 shows a sectional view according to line IV-IV of FIG. 3;

FIG. 5 shows a sectional view according to line V-V of FIG. 3;

FIG. 6 shows a third perspective view of the reciprocating compressor valve, with a sectional portion according to line V-V of FIG. 3;

DETAILED DESCRIPTION OF EMBODIMENTS

Figure 7:
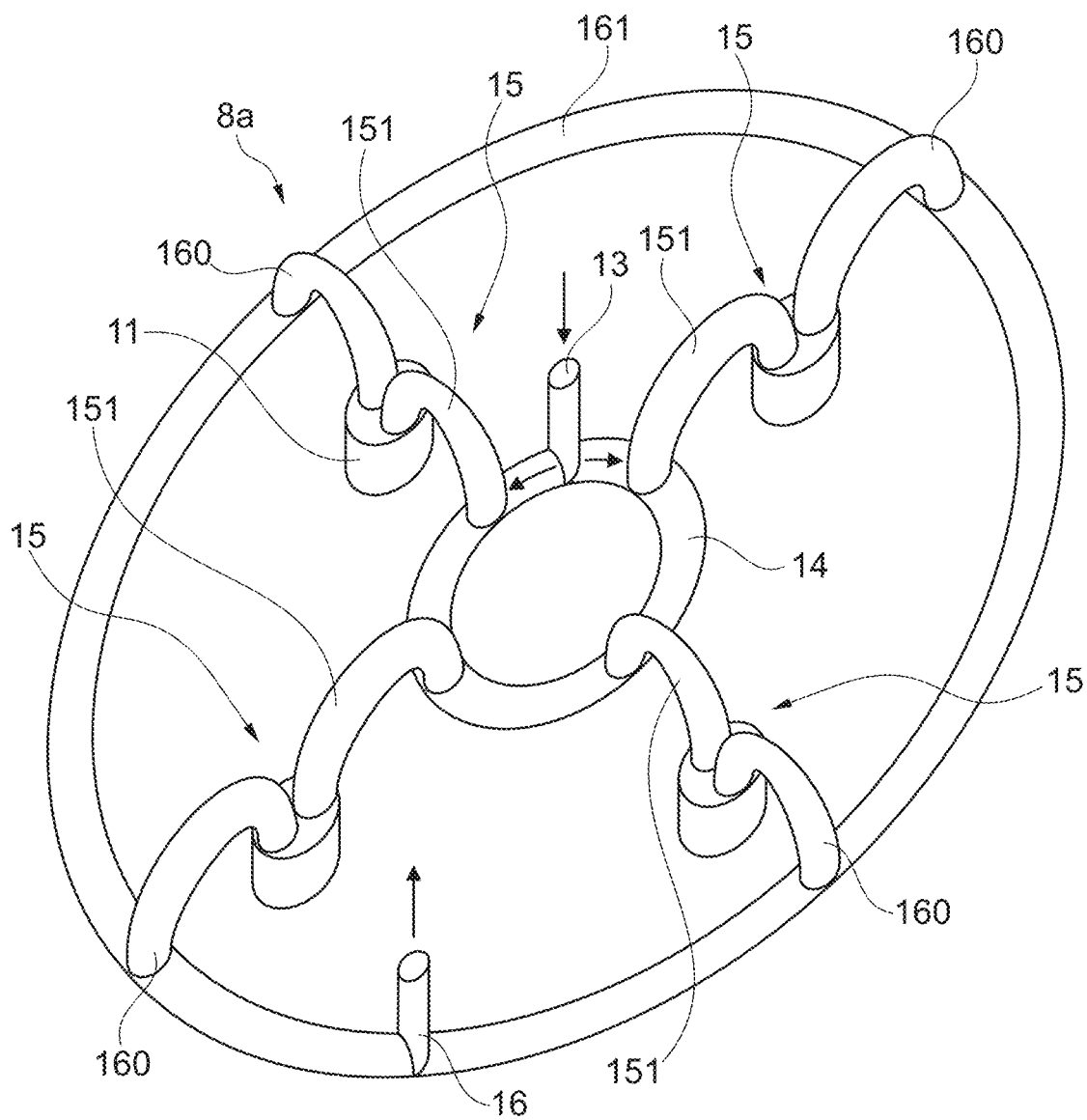
FIG. 7 shows a first portion of the hydraulic circuit integrated in a seat of the reciprocating compressor valve of FIG. 1-6.

According to one aspect, the present subject matter is directed to a valve for a reciprocating compressor, wherein the pressure over each piston of a plurality of pistons has the same value. The valve has a hydraulic apparatus for moving a shutter element at least between the open and the closed positions, comprising a hydraulic circuit of which at least a first portion is integrated in the seat or in the guard. The first portion of the hydraulic circuit comprises at least an inlet, a distributing duct and a plurality of radial ducts. The distributing duct which has a shape of at least a portion of a ring, and the plurality of radial ducts are radially arranged with respect to the shape of the distributing duct.

In order to provide the same pressure over each piston the shape of the first portion of the hydraulic circuit is made by additive manufacturing technology according to digital 3D design data. Accordingly, the shape is arranged following the best project without limitations of manufacturing. Any shape can be provided in an easy way. In this regard, suitable additive manufacturing technologies are Vat Photopolymerization; Stereolithography (SLA), Direct Light Processing (DLP), Continuous DLP (CDLP), Powder Bed Fusion, Selective Laser Sintering (SLS), Selective Laser Melting (SLM), Direct Metal Laser Sintering (DMLS), Electron Beam Melting (EBM), Multi Jet Fusion (MJF), Material Extrusion, Fused Deposition Modeling (FDM), Material Jetting; Material Jetting, Nano Particle Jetting, Drop-On-Demand (DOD), Binder Jetting, Direct Energy Deposition, Laser Engineered Net Shape (LENS), Electron Beam Additive Manufacture (EBAM), Sheet Lamination, such as Ultrasonic Additive Manufacturing (UAM), and Laminated Object Manufacturing (LOM). A range of different metals, plastics and composite materials may be used, such as Aluminium alloys, Cobalt based alloys, Nickel based alloys, Stainless steels (e.g. Austenitic stainless steel, Martensitic stainless steel, Martensitic precipitation-hardened stainless steel), Titanium alloys, Copper alloys, Acrylonitrile Butadiene Styrene (ABS), Polylactide (PLA), Nylon, Polycarbonate (PC), Polyvinyl Alcohol (PVA), Fiber-Reinforced Composites, Polyaryletherketones (PAEK), Polyetheretherketones (PEEK), and Polyetherketones (PEK).

References now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or the spirit of the disclosure.

Referring now to drawings, FIGS. 1, 2, 3, 4, 5 and 6 show a reciprocating compressor comprising a valve 1 which is provided with a valve body 2. The valve body 2 comprises a seat 3 and a guard 4. Both the seat 3 and the guard 4 develop substantially parallel to a valve plane A, and are provide with a plurality of cavities 5, each shaped as an arc.

A shutter element 6 is placed between the seat 3 and the guard 4, and develops substantially parallel to the valve plane A. The shutter element 6 is arranged to move between a closed position in which the passage of fluid is prevented, and an open position in which the passage of fluid is allowed inside the valve 1.

The shutter element 6 is pushed against the seat 3 by a set of springs (not shown) acting between the guard 4 and the shutter element itself. The passage of fluid is thus prevented. When the pressure from the working fluid increases beyond a predetermined threshold, it can then overcome the elastic force of the springs, thus forcing the valve open and allowing the passage of the fluid until the pressure decreases below the acting threshold.

The valve 1 also comprises a hydraulic apparatus 7 for moving the shutter element 6 at least between the open and the closed positions. The shutter element 6 can stop in an intermediate position between the open and closed positions. The hydraulic apparatus 7 comprises a hydraulic actuator (not shown) and a hydraulic circuit 8 of which at least a first portion 8a is integrated in the seat 3, and at least a second portion 8b is integrated in the guard 4.

The hydraulic apparatus 7 also comprises a plurality of pistons 9, 10. Each piston 9, 10 is at least partially inserted into a respective housing 11, 12 inside the valve body 2. Each piston 9, 10 is also placed in contact with the shutter element 6.

The pistons 9 are inserted into respective housings 11 provided inside the seat 3 and are driven by the first portion 8a of the hydraulic circuit 8. The pistons 10 are inserted into respective housings 12 provided inside the guard 4 and are driven by the second portion 8b of the hydraulic circuit 8. Each piston 9 is placed opposite to a piston 10 with respect to the shutter element 6 and is joined to a corresponding piston 10. Alternately pistons 9, 10 can have a different arrangement, not opposite neither joined to each other.

The pistons 9, 10 may either be constructed as a single piece or constructed as separate pieces and then joined later as shown in FIGS. 4, 5 and 6.

According to a first embodiment (FIG. 7), the first portion 8a of the hydraulic circuit 8 comprises an inlet 13, a distributing duct 14 with a ring shape, and a plurality of radial ducts 15. Said radial ducts 15 are arranged radially with respect to said ring shape of the duct 14. Each radial duct 15 comprises an inlet portion 151 leading to a housing 11 over a respective piston 9, and an outlet portion 160 starting from said housing 11 and leading to an outlet duct 161 with a ring shape. Said outlet duct 161 leads to an outlet 16. More than one inlet 13 and more than one outlet 16 can be provided.

Differently, according to a second embodiment (FIG. 8), the inlet portion 151 leads to a branched portion 152 in which the flux is divided into a couple of ducts 153 ending over a respective housing 11 of the seat 3. The inlet portion 151 could be provided with a couple of ducts 154 coming from a first common node 155, connected to the distributing duct 14, and ending in a second common node 156 wherein the inlet portion 151 is connected to the branched portion 152.

Figure 8:
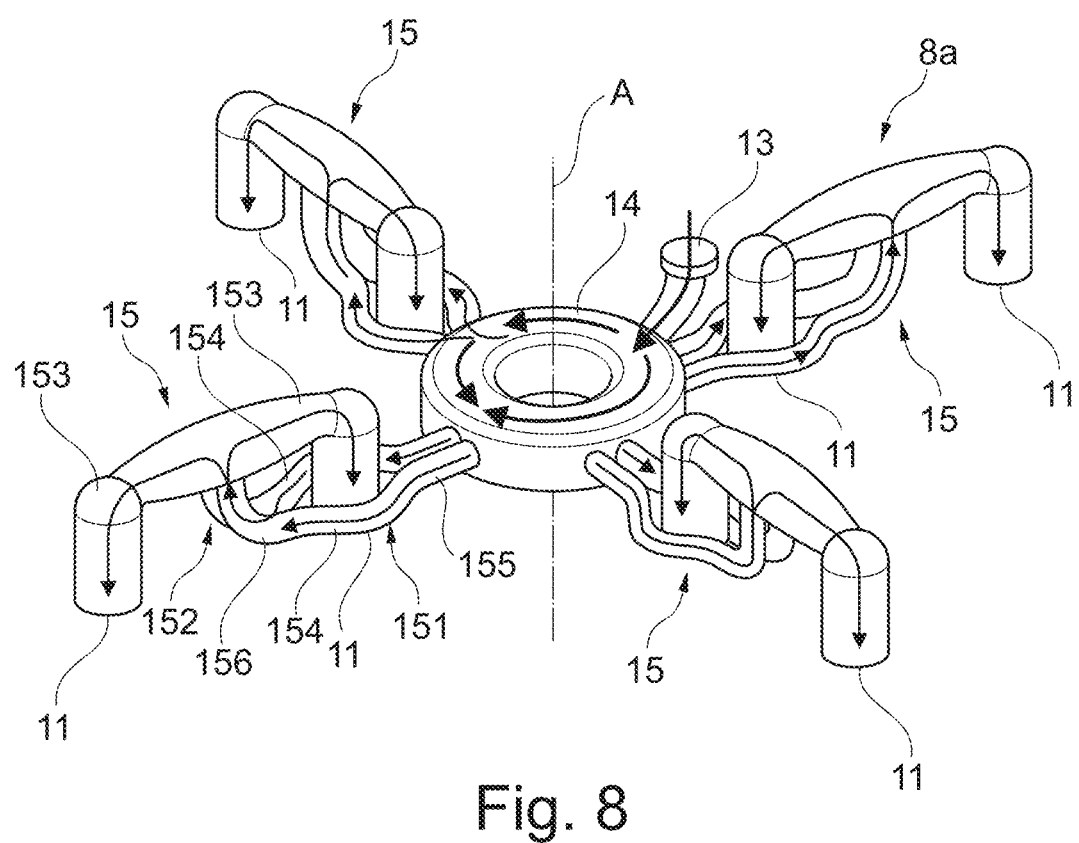
FIG. 8 shows a first portion of a hydraulic circuit integrated in a seat of according to a second embodiment of a reciprocating compressor valve.

As shown in FIG. 8, the couple of ducts 154 are shaped such that a duct 153 can expand between them. The branched portion 152 is arranged such that the flux firstly goes up and then is divided into said ducts 153 leading to a housing 11 over a piston 9. Every branched portion 152 is connected to an outlet portion 160 (not shown) as well as in the embodiment of FIG. 7.

Figure 9:
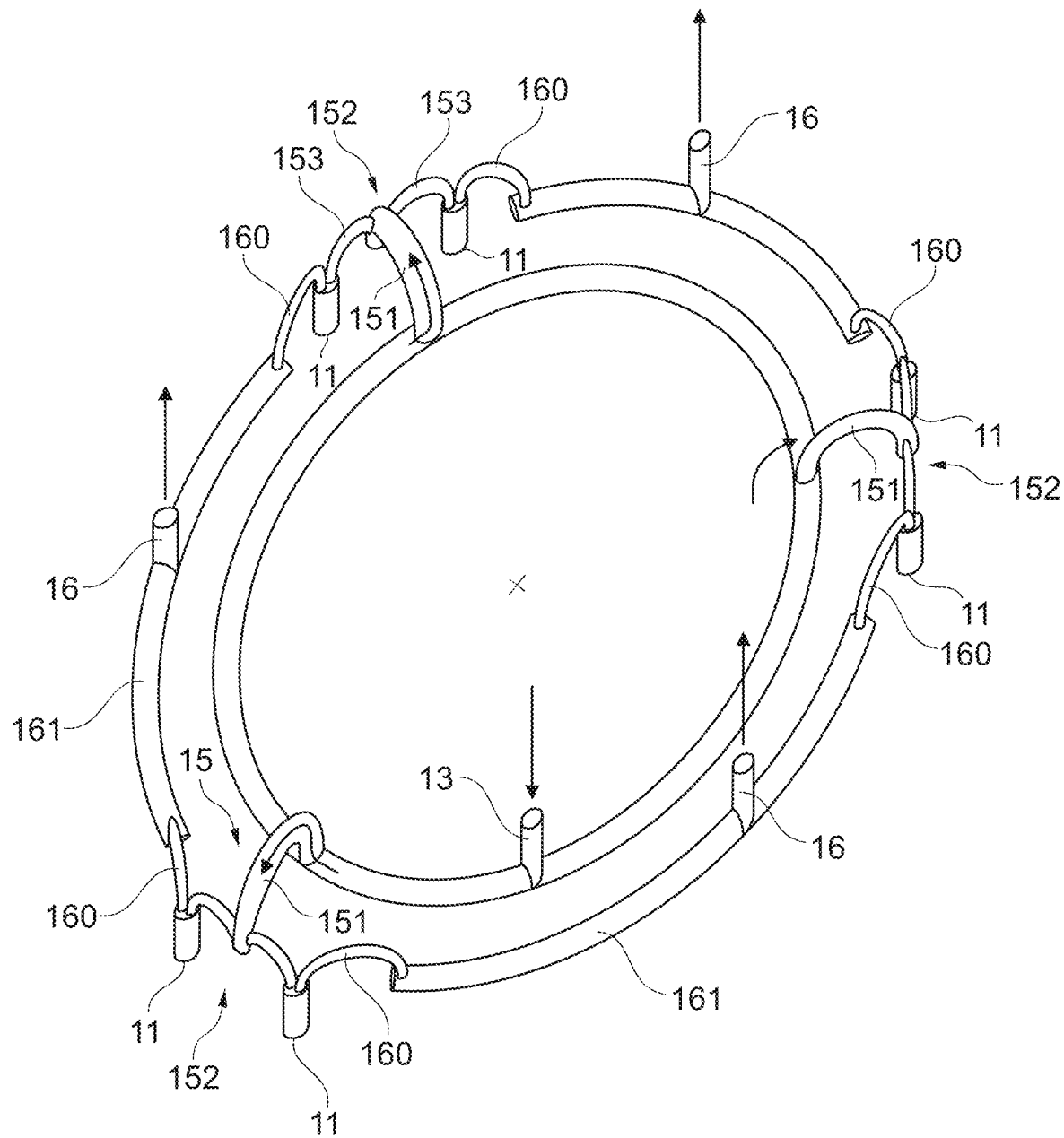
FIG. 9 shows a first portion of a hydraulic circuit integrated in a seat of according to a third embodiment of a reciprocating compressor valve.

In a third embodiment (FIG. 9), the distributing duct 14 has a ring shape and a plurality of inlet portions 151 leads to a respective branched portion 152. The branched portion 152 is similar to the second embodiment, namely the flux is divided into a couple of ducts 153 leading to a respective housing 11. Differently said ducts 153 are oriented following the shape of outlet ducts 161. Therefore, each radial duct 15 consist of a respective inlet portion 151. Each outlet duct 161 has the shape of an arc and connects two different branched portions 152 to a common outlet 16. The third embodiment is provided with three outlets 16.

With reference to all embodiments, the shape of the first portion 8a is made by additive manufacturing technology, according to digital 3D design data. During the project phase, made by a personal computer, it is imposed that the pressure onto each housing 11, over each piston 9, is the same. The layout of the hydraulic circuit 8 can changed, but said driving pressure moving the pistons 9, 10 shall be the same onto each housing 11 of the seat 4.

Preferably the shape of the hydraulic circuit 8 is symmetrical with respect to a vertical axis V which is orthogonal to said valve plane A. Additive manufacturing technology allows to easily make every kind of shape of the hydraulic circuit 8.

The second portion 8b of the hydraulic circuit has preferably a branched shape in order to lead the fluid towards an outlet 16. The second portion 8b is able to provide the same pressure over each piston 10, as well as the first portion 8a over each piston 9. The first portion 8a and the second portion 8b are independent with respect each other.

The second portion 8b can have the same shape of the first portion 8a, with an inlet and an outlet as well as the first portion 8a. Advantageously the hydraulic circuit 8 is born with the valve body 2, i.e. with either the seat 3 and the guard 4. Additive manufacturing allows precise dimensioning of the ducts according to 3D data generated by a software of a personal computer.

Different shapes of the hydraulic circuit 8 could be provided according to the shape of the reciprocating compressor and of the performance to be achieved. Additive manufacturing allows to obtain shapes of the hydraulic circuit 8 not feasible with other means such as by special tools removing materials or traditional 3D printing machines.

Advantageously homogeneous movement of the pistons and consequently of the shutter elements is provided. The valve according to the disclosed embodiments is suitable for both suction and discharge assemblies. Alternately only the seat 3 or the guard 4 can be provided with a portion 8a, 8b of the hydraulic circuit 8.

The invention claimed is:

1. A valve for a reciprocating compressor, the valve comprising:
   a valve body which comprises a seat and a guard, wherein the seat and the guard develop substantially parallel to a valve plane;
   at least a shutter element placed between the seat and the guard, and which develops substantially parallel to the valve plane, the shutter element is arranged to move at least between a closed position in which the passage of fluid is prevented, and an open position in which the passage of fluid is allowed inside the valve;
   a hydraulic apparatus configured to move the shutter element at least between the open and the closed positions, the hydraulic apparatus comprising a hydraulic circuit of which at least a first portion is integrated in the seat or in the guard, and a plurality of pistons comprising a first set of pistons at least partially inserted into respective housings provided inside the seat and a second set of pistons at least partially inserted into respective housings provided inside the guard,
   wherein the shape of the first portion of the hydraulic circuit is made by additive manufacturing technology according to digital 3D design data, and the first portion of the hydraulic circuit comprises at least an inlet, a distributing duct having a shape of at least a portion of a ring, and a plurality of radial ducts radially arranged with respect to shape of the distributing duct.

2. The valve according to claim 1, wherein each radial duct comprises an inlet portion leading to a housing over a respective piston, and an outlet portion leading to an outlet duct which leads to at least an outlet.

3. The valve according to claim 1, wherein each radial duct comprises an inlet portion leading to a branched portion in which the flux is divided into at least a first couple of ducts ending over a respective piston.

4. The valve according to claim 3, wherein the inlet portion is connected to the branched portion and comprises a second couple of ducts extending from a first common node connected to the distributing duct and ending at a second common node.

5. The valve according to claim 4, wherein the second couple of ducts are shaped such that a duct of the at least first couple of ducts can expand between them.

6. The valve according to claim 4, wherein the branched portion is arranged such that the flux firstly goes up and is then divided in the at least first couple of ducts leading to a respective housing over a piston.

7. The valve according to claim 3, further comprising outlet ducts, each of the outlet ducts connecting two different branched portions to a common outlet.

8. The valve according to claim 1, wherein the hydraulic circuit comprises at least a first portion integrated in the seat, and at least a second portion integrated in the guard, the shape of the first portion and the second portion of the hydraulic circuit made by additive manufacturing technology according to digital 3D design data.

9. The valve according to claim 8, wherein the second portion of the hydraulic circuit has an outlet.

10. The valve according to claim 1, wherein the shape of the hydraulic circuit is symmetrical with respect to a vertical axis which is orthogonal to the valve plane.

11. The valve according to claim 8, wherein the first portion and the second portion are independent with respect to each other.

12. The valve according to claim 1, wherein each piston of the first set of pistons is placed opposite to a piston of the second set of pistons) with respect to the shutter element.

13. A valve for a reciprocating compressor, the valve comprising:
   a valve body comprising a seat and a guard;
   a shutter element placed between the seat and the guard and arranged to move at least between a closed position to prevent fluid flow and an open position to allow fluid flow;
   a hydraulic apparatus configured to move the shutter element at least between the closed position and the open position, the hydraulic apparatus comprising a hydraulic circuit, of which at least a first portion is integrated in the seat or in the guard, and a plurality of pistons comprising a first set of pistons at least partially inserted into respective housings provided inside the seat and a second set of pistons at least partially inserted into respective housings provided inside the guard,
   wherein the first portion of the hydraulic circuit comprises at least an inlet, a distributing duct having a shape of at least a portion of a ring, and a plurality of radial ducts radially arranged with respect to shape of the distributing duct.

* * * * *